US009788577B2

(12) United States Patent
Liu

(10) Patent No.: US 9,788,577 B2
(45) Date of Patent: Oct. 17, 2017

(54) ELECTRONIC CIGARETTE

(71) Applicant: Tuanfang Liu, Ji'an (CN)

(72) Inventor: Tuanfang Liu, Ji'an (CN)

( * ) Notice: Subject to any disclaimer, the term of this patent is extended or adjusted under 35 U.S.C. 154(b) by 199 days.

(21) Appl. No.: 14/735,116

(22) Filed: Jun. 9, 2015

(65) Prior Publication Data

US 2016/0295920 A1 Oct. 13, 2016

(30) Foreign Application Priority Data

Apr. 7, 2015 (CN) .......................... 2015 2 0203217

(51) Int. Cl.
*A01G 13/06* (2006.01)
*A24F 47/00* (2006.01)
*H05B 3/00* (2006.01)

(52) U.S. Cl.
CPC ......... *A24F 47/008* (2013.01); *H05B 3/0014* (2013.01); *A24F 47/00* (2013.01)

(58) Field of Classification Search
CPC ........ A24F 47/008; A24F 47/00; A24F 23/00; A24F 25/00; H05B 3/0014; H05B 3/02–3/026; H05B 3/03; H05B 3/40; H05B 3/60
USPC ....... 219/267, 209, 201, 268, 227, 482, 490, 219/494, 474, 534, 542, 553, 507, 260, 219/261, 262, 270; 392/386, 397, 394, 392/404
See application file for complete search history.

(56) References Cited

U.S. PATENT DOCUMENTS

| | | | | | |
|---|---|---|---|---|---|
| 2013/0319407 | A1* | 12/2013 | Liu | A61M 15/06 | 128/202.21 |
| 2014/0041655 | A1* | 2/2014 | Barron | A61M 11/042 | 128/202.21 |
| 2014/0130796 | A1* | 5/2014 | Liu | A24F 47/008 | 128/202.21 |
| 2014/0311503 | A1* | 10/2014 | Liu | G02B 27/18 | 131/329 |
| 2015/0077981 | A1* | 3/2015 | Cormack | A61M 15/06 | 362/190 |

* cited by examiner

*Primary Examiner* — Sang Y Paik
(74) *Attorney, Agent, or Firm* — Matthias Scholl, PC; Matthias Scholl

(57) ABSTRACT

An electronic cigarette, including: a cigarette holder assembly; a fixing seat assembly; an atomization assembly; a gas flow control assembly; and a glass housing. The cigarette holder assembly is made of metal. The fixing seat assembly operates to fix the glass housing and to regulate an air flow. The atomization assembly is disposed inside the glass housing. The heating wires are disposed inside the atomization assembly. The cigarette holder assembly is connected to the fixing seat assembly in the manner of plugging. The glass housing is connected to a middle support via a fixing jaw. The atomization assembly is assembled with the gas flow control assembly using screw threads to form an integrated structure, and the integrated structure of the atomization assembly and the gas flow control assembly is then assembled with the fixing seat assembly.

5 Claims, 4 Drawing Sheets

ELECTRONIC CIGARETTE

CROSS-REFERENCE TO RELATED APPLICATIONS

Pursuant to 35 U.S.C. §119 and the Paris Convention Treaty, this application claims the benefit of Chinese Patent Application No. 201520203217.2 filed Apr. 7, 2015, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to an electronic cigarette.

Description of the Related Art

It is well-known that smoking is harmful to health, but there are still hundreds of millions of smokers in the world. Since prohibition of smoking in public places is commonplace, cigarette substitutes have proliferated, including nicotine patches, nicotine mouthwash, nicotine gum, and nicotine drinks. Although the cigarette substitutes are a step in the right direction as they do not deliver tar, nicotine is only slowly absorbed in the blood and thus the achieved effective peak concentration of nicotine is relatively low, and the feeling of satisfaction resulting from a high concentration of tobacco alkali is not achieved. Meanwhile, users consuming cigarette substitutes are deprived of smoking actions such as inhaling, exhaling, and puffing.

A conventional electronic cigarette employs a plastic cigarette holder and a plastic housing, and cannot regulate the air flow. Thus, the smoke volume cannot be adjusted according to personal preference. In use, a chemical reaction between the plastic materials and the tobacco tar may happen and produce harmful matters. In addition, the tobacco tar is difficult to load.

SUMMARY OF THE INVENTION

In view of the above-described problems, it is one objective of the invention to provide an electronic cigarette that features adjustable gas flow intake, cigarette holder capable of adjusting the gas flow, safe and environmentally friendly materials, convenient operation, and high electrical compatibility.

To achieve the above objective, in accordance with one embodiment of the invention, there is provided an electronic cigarette, comprising: a cigarette holder assembly; a fixing seat assembly, the fixing seat assembly comprising a middle support; an atomization assembly; a gas flow control assembly; and a glass housing. The cigarette holder assembly is made of metal. The fixing seat assembly operates to fix the glass housing and to regulate an air flow. The glass housing is a transparent cylinder. The atomization assembly is disposed inside the glass housing. The heating wires are disposed inside the atomization assembly. The cigarette holder assembly is connected to the fixing seat assembly in the manner of plugging. The glass housing is connected to the middle support via a fixing jaw. The atomization assembly is assembled with the gas flow control assembly using screw threads to form an integrated structure, and the integrated structure of the atomization assembly and the gas flow control assembly is then assembled with the fixing seat assembly.

In a class of this embodiment, the heating wires are spirally disposed at intervals and are vertical to a cylindrical surface of the glass housing; and the heating wires are wrapped with sanitary cotton.

In a class of this embodiment, the cigarette holder assembly comprises: a cigarette holder and a first sealing ring. A front end of the cigarette holder comprises a boss, and the first sealing ring is disposed on the boss.

In a class of this embodiment, the fixing seat assembly comprises: a limit seat for regulating the cigarette holder, a second sealing ring for regulating the cigarette holder, an oil leaking seat, a first gas flow regulation ring, the middle support, a bottom rod, a fixing jaw, a screw, a sealing seat, and a third sealing ring. The bottom rod passes through the fixing jaw and is inserted into the middle support from a bottom thereof. The third sealing ring is disposed on the sealing seat, and the sealing seat is disposed inside the screw. The middle support is tightly cooperated with a steel tube. The glass housing is connected with the steel tube and is connected to the cigarette holder assembly via a fixing jaw.

In a class of this embodiment, the middle support operates to regulate the air flow. The first sealing ring is disposed between the cigarette holder and the middle support. The second seal ring is disposed in the middle support for fixing the oil leaking seat. The middle support is nested within the first gas flow regulation ring, and the limit seat presses on the middle support. The bottom rod is in fixed connection with the middle support, and a sealing gasket is disposed in the middle support.

In a class of this embodiment, the atomization assembly comprises, from the top down, a steel mesh, a limit cover, heating wires, a first sanitary cotton, a second sanitary cotton, a fourth sealing ring, a fixing ring for fixing the heating wires, an insulation ring for insulating the heating wires, and an atomization joint.

In a class of this embodiment, the gas flow control assembly comprises, from the top down, a fifth sealing ring, a section pin, a section spring, a gas flow control ring, a sixth sealing ring, an oil leaking lid, a second gas flow regulation ring, an outer copper thread ring, a joint, and an insulation ring of the joint. A bottom of the glass housing is sealed by the fifth sealing ring.

In a class of this embodiment, the cigarette holder is disposed on a top of the electronic cigarette. The cigarette holder is connected to the fixing seat assembly in the manner of plugging and is connected to the glass housing via the fixing jaw.

Advantages according to embodiments of the invention are summarized as follows:

By arranging the heating wires evenly and vertically in the glass housing, the smoke oil in the height direction is uniformly heated and evaporated in the glass housing. Furthermore, the heating wires having a low resistance value are employed. Such the heating wires have large calorific values. The gas flow control assembly comprises large sized gas holes in order to realize smoother smoke and larger smoke volume. The middle support operates to regulate the air flow, and the high temperature smoke is neutralized by the air flow at the middle support, thereby decreasing the temperature of the smoke. Thus, the electronic cigarette produces larger smoke volume, higher concentration, and proper temperature not burning the mouth.

BRIEF DESCRIPTION OF THE DRAWINGS

The invention is described hereinbelow with reference to the accompanying drawings, in which.

DETAILED DESCRIPTION OF THE EMBODIMENTS

Figure 1:
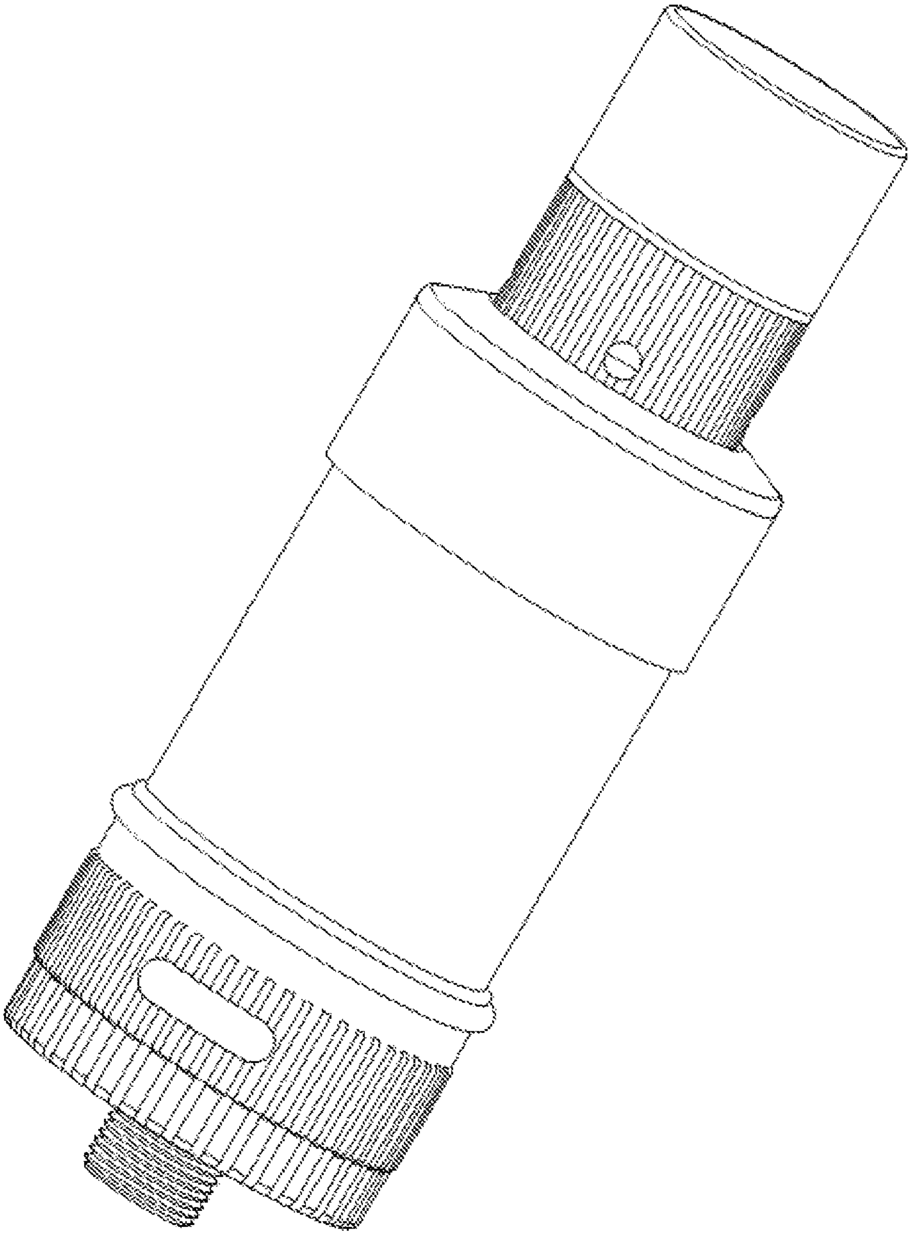
FIG. 1 is a stereogram of an electronic cigarette in accordance with one embodiment of the invention.
Figure 2:
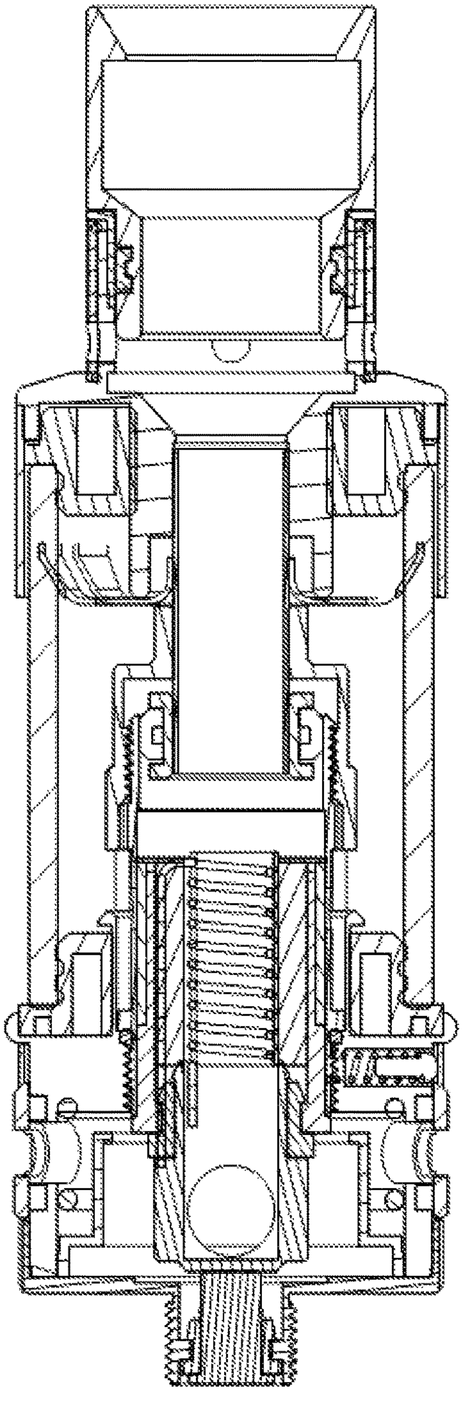
FIG. 2 is a sectional view of an electronic cigarette in accordance with one embodiment of the invention.
Figure 3:
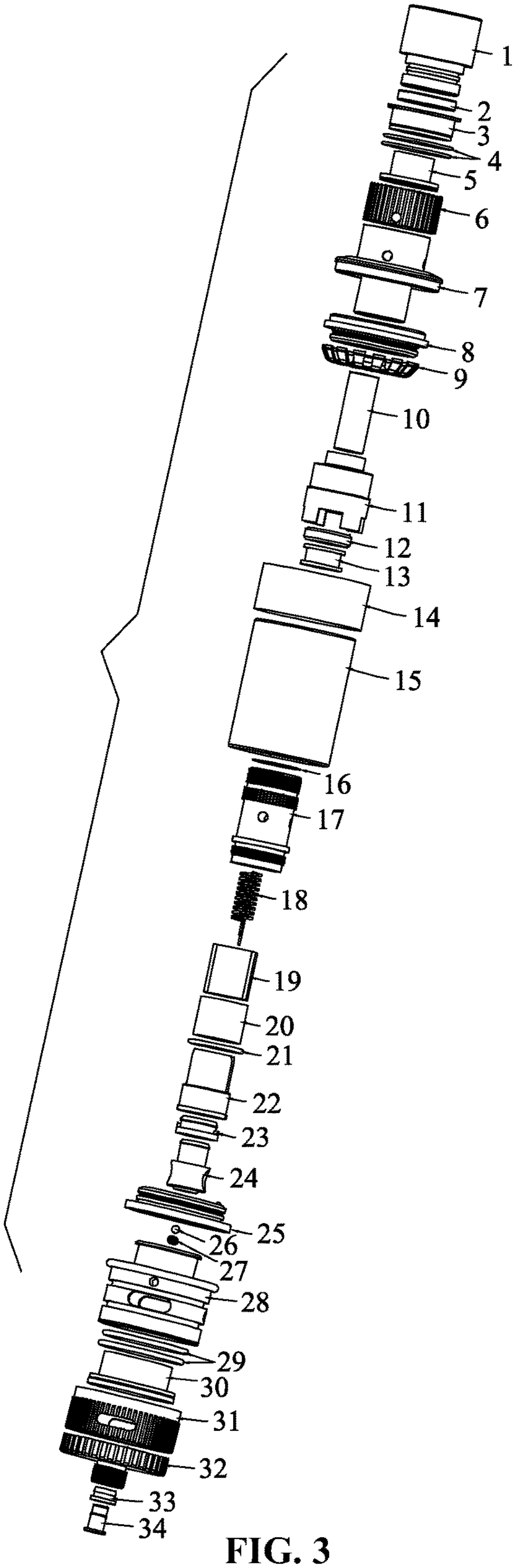
FIG. 3 is a first exploded view of an electronic cigarette in accordance with one embodiment of the invention.
Figure 4:
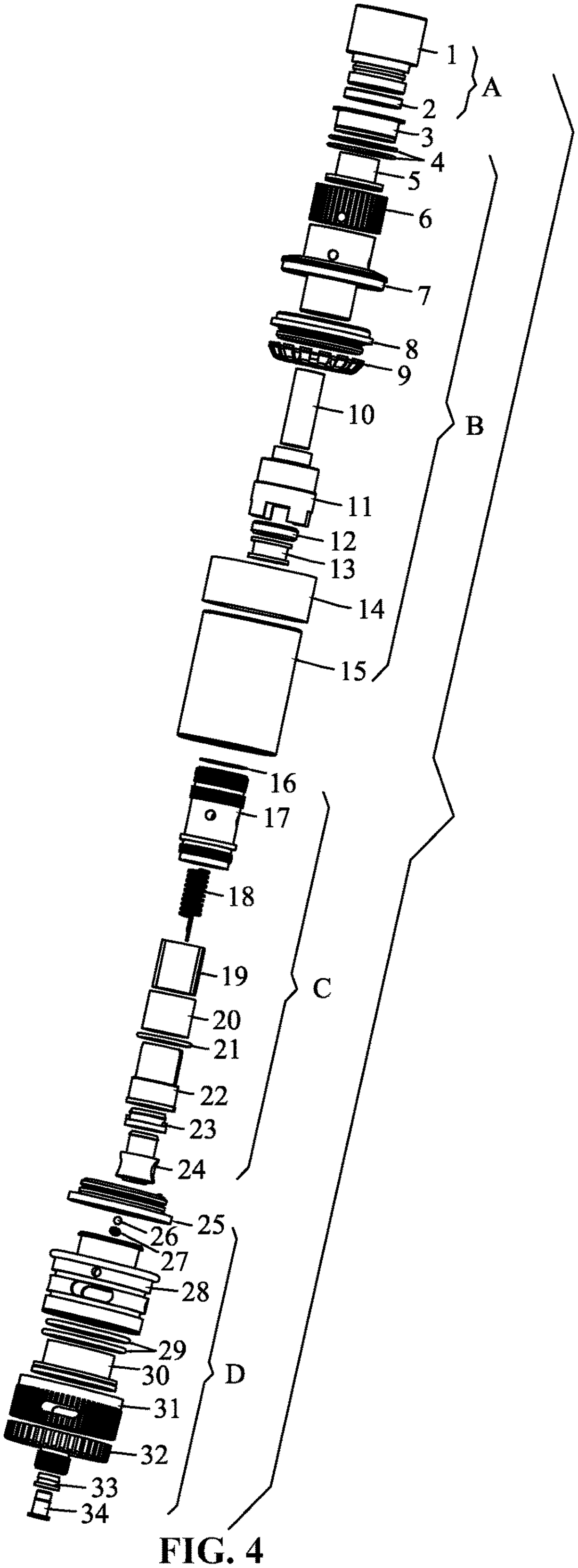
FIG. 4 is a second exploded view of an electronic cigarette in accordance with one embodiment of the invention.

For further illustrating the invention, experiments detailing an electronic cigarette are described below. It should be noted that the following examples are intended to describe and not to limit the invention.

An electronic cigarette comprises: an atomization assembly C and a transparent cylindrical glass housing 15. The atomization assembly is disposed in the glass housing 15. Heating wires 17 are disposed in the atomization assembly at intervals and are vertical to a cylindrical surface of the glass housing. The heating wires are wrapped with sanitary cotton. The heating wires employ those with low resistance value; preferably, the resistance value is smaller than 1 Ω.

Preferably, the electronic cigarette further comprises: a cigarette holder assembly A, a fixing seat assembly B capable of fixing the glass housing and regulating an air flow, and a gas flow assembly D. The cigarette holder assembly A is connected to the fixing seat assembly B in the manner of plugging. The glass housing 15 is connected to the cigarette holder assembly A via a fixing jaw. The atomization assembly C is assembled with the gas flow control assembly D using screw threads to form an integrated structure, and the integrated structure of the atomization assembly C and the gas flow control assembly D is then assembled with the fixing seat assembly B.

Specifically, in one embodiment of the invention, the electronic cigarette comprises: the cigarette holder assembly A, the fixing seat assembly B capable of fixing the glass housing and regulating the air flow, the atomization assembly C, and a gas flow assembly D. The cigarette holder assembly A is connected to the fixing seat assembly B in the manner of plugging. The glass housing 15 is connected to the cigarette holder assembly A via the fixing jaw. The atomization assembly C is assembled with the gas flow control assembly D using screw threads to form an integrated structure, and the integrated structure of the atomization assembly C and the gas flow control assembly D is then assembled with the fixing seat assembly B.

The cigarette holder assembly comprises: a metal top, a cigarette holder 1, and a first sealing ring 2. The fixing seat assembly comprises: a limit seat 3 for regulating the cigarette holder, a second sealing ring 4 for regulating the cigarette holder, an oil leaking seat 5, a first gas flow regulation ring 6, a middle support 7, a bottom rod 10, the fixing jaw 9, and a screw 11. The bottom rod passes through the fixing jaw 9 and is inserted into the middle support 7 from a bottom of the middle support 7. A sealing seat 13 is assembled with a third sealing ring 12 and both of them are mounted inside the screw 11. A steel tube 14 is tightly cooperated with the middle support 7. The glass housing 15 is cooperated with the cigarette holder assembly A via the fixing jaw 9. The glass tube is replaceable. The first sealing ring 2 is disposed between the cigarette holder 1 and the middle support 7. The bottom rod 10 is in fixed connection with the middle support, and a sealing gasket 8 is disposed in the middle support 7. The atomization assembly comprises, from the top down, a steel mesh 16, a limit cover 17, heating wires 18, an oil guide cotton 19, sanitary cotton 20, a fourth sealing ring 21, a fixing ring 22 for fixing the heating wires, an insulation ring 23 for insulating the heating wires, and an atomization joint 24. The gas flow control assembly comprises, from the top down, a fifth sealing ring 25, a section pin 26, a section spring 27, a gas flow control ring 28, a sixth sealing ring 29, an oil leaking lid 30, a second gas flow regulation ring 31, an outer copper thread ring 32, a joint 34, and an insulation ring 33 of the joint. A bottom of the glass housing is sealed by the fifth sealing ring 25.

Specifically, the atomization assembly is disposed in the cylindrical glass housing. The heating wires are disposed in the atomization assembly. The heating wires are spirally disposed at intervals and are vertical to the cylindrical surface of the glass housing. The electronic cigarette further comprises: the cigarette holder assembly and the fixing seat assembly. The cigarette holder assembly is disposed on a top of the electronic cigarette. The cigarette holder assembly is tightly cooperated with the fixing seat assembly in the manner of plugging and is further connected to the glass housing via the fixing jaw. By arranging the heating wires evenly and vertically in the glass housing, the smoke oil in the height direction is uniformly heated and evaporated in the glass housing. Furthermore, the heating wires having a low resistance value are employed. Such the heating wires have large calorific values. The gas flow control assembly comprises large sized gas holes in order to realize smoother smoke and larger smoke volume. The middle support operates to regulate the air flow, and the high temperature smoke is neutralized by the air flow at the middle support, thereby decreasing the temperature of the smoke. Thus, the electronic cigarette produces larger smoke volume, higher concentration, and proper temperature not burning the mouth.

In addition, the atomization assembly is disposed in the cylindrical glass housing. The heating wires are disposed in the atomization assembly. The heating wires are spirally disposed at intervals and are vertical to the cylindrical surface of the glass housing.

The gas flow control assembly comprises gas flow regulation holes with enlarged sizes, thereby ensuring smooth gas flow.

In addition, the heating wires are vertical heating wires wrapped by sanitary cotton for guiding the oil. No oil guiding matter exists in the heating wires. The resistance value of the heating wires is smaller than 1 Ω.

The electronic cigarette of the invention preferably comprises: the cigarette holder assembly A and the fixing seat assembly B. The cigarette holder assembly A is disposed on the top of the electronic cigarette. The cigarette holder assembly is tightly cooperated with the fixing seat assembly in the manner of plugging and is further connected to the glass housing 15 via the fixing jaw.

Preferably, the sizes of the gas holes in the air flow adjustable middle support and the gas flow control assembly are enlarged, thereby realizing much smoother gas flow, much concentrated smoke with large smoke volume and proper temperature avoiding burning the mouth.

Compared with the prior art, the electronic cigarette has the following advantages:

1. The heating wires are disposed evenly and vertically in the glass housing and thus the smoke oil is uniformly heated and evaporated. Besides, because of the vertical arrangement of the heating wires, the smoke oil in the height direction is uniformly heated and can be evaporated synchronously.

2. The integral structure of the electronic cigarette realizes double-flow regulation via the middle support and the gas flow control assembly, so that the gas flow is much smoother, the smoke has larger quantity and is much concentrated and prevented from burning the mouth, thereby being environmentally friendly.

3. The heating wires have enlarged calorific value when the resistance value thereof is smaller than 1 Ω. The smoke volume is significantly enlarged, so that it is necessary for the middle support and the gas flow control assembly to decrease the temperature of the large quantified smoke, thereby realizing large smoke volume, high concentration, and proper temperature.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An electronic cigarette, comprising:

a) a cigarette holder assembly, the cigarette holder assembly comprising a cigarette holder and a first sealing ring;

b) a fixing seat assembly, the fixing seat assembly comprising a middle support;

c) an atomization assembly;

d) a gas flow control assembly; and e) a glass housing;

wherein:

the cigarette holder assembly is metal; the fixing seat assembly operates to fix the glass housing and to regulate an air flow; the glass housing is a transparent cylinder;

the atomization assembly is disposed inside the glass housing;

heating wires are disposed inside the atomization assembly;

the cigarette holder assembly is connected to the fixing seat assembly in the manner of plugging;

the glass housing is connected to the middle support via a fixing jaw;

the atomization assembly is assembled with the gas flow control assembly using screw threads to form an integrated structure, and the integrated structure of the atomization assembly and the gas flow control assembly is then assembled with the fixing seat assembly;

the heating wires are spirally disposed at intervals and are vertical to a cylindrical surface of the glass housing; and the heating wires are wrapped with sanitary cotton;

a front end of the cigarette holder comprises a boss, and the first sealing ring is disposed on the boss;

the fixing seat assembly comprises: a limit seat for regulating the cigarette holder, a second sealing ring for regulating the cigarette holder, an oil leaking seat, a first gas flow regulation ring, the middle support, a bottom rod, a fixing jaw, a screw, a sealing seat, and a third sealing ring; the bottom rod passes through the fixing jaw and is inserted into the middle support from a bottom thereof;

the third sealing ring is disposed on the sealing seat, and the sealing seat is disposed inside the screw;

the middle support is tightly cooperated with a steel tube; and the glass housing is connected with the steel tube and is connected to the cigarette holder assembly via a fixing jaw.

2. The electronic cigarette of claim 1, wherein the middle support operates to regulate the air flow;

the first sealing ring is disposed between the cigarette holder and the middle support;

the second seal ring is disposed in the middle support for fixing the oil leaking seat; the middle support is nested within the first gas flow regulation ring, and the limit seat presses on the middle support; and the bottom rod is in fixed connection with the middle support, and a sealing gasket is disposed in the middle support.

3. The electronic cigarette of claim 2, wherein the atomization assembly comprises, from the top down, a steel mesh, a limit cover, heating wires, a first sanitary cotton, a second sanitary cotton, a fourth sealing ring, a fixing ring for fixing the heating wires, an insulation ring for insulating the heating wires, and an atomization joint.

4. The electronic cigarette of claim 3, wherein the gas flow control assembly comprises, from the top down, a fifth sealing ring, a section pin, a section spring, a gas flow control ring, a sixth sealing ring, an oil leaking lid, a second gas flow regulation ring, an outer copper thread ring, a joint, and an insulation ring of the joint; and a bottom of the glass housing is sealed by the fifth sealing ring.

5. The electronic cigarette of claim 4, wherein the cigarette holder is disposed on a top of the electronic cigarette; and the cigarette holder is connected to the fixing seat assembly in the manner of plugging and is connected to the glass housing via the fixing jaw.

* * * * *